(12) United States Patent
Li (10) Patent No.: US 12,074,814 B2
(45) Date of Patent: Aug. 27, 2024

(54) MEASUREMENT CONFIGURATION METHOD, APPARATUS, DEVICES, SYSTEM, AND STORAGE MEDIUM (71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 699 days.

(21) Appl. No.: 17/279,792

(22) PCT Filed: Sep. 27, 2018

(86) PCT No.: PCT/CN2018/108112
§ 371 (c)(1),
(2) Date: Mar. 25, 2021

(87) PCT Pub. No.: WO2020/061953
PCT Pub. Date: Apr. 2, 2020

(65) Prior Publication Data
US 2021/0336737 A1  Oct. 28, 2021

(51) Int. Cl.
*H04L 5/00* (2006.01)
*H04B 17/318* (2015.01)
(Continued)

(52) U.S. Cl.
CPC ......... *H04L 5/0048* (2013.01); *H04B 17/318* (2015.01); *H04W 72/046* (2013.01); *H04W 72/21* (2023.01)

(58) Field of Classification Search
CPC .... H04L 5/0048; H04B 17/318; H04W 72/21; H04W 72/046
See application file for complete search history.

(56) References Cited

U.S. PATENT DOCUMENTS 9,143,998 B2 *  9/2015  Kobayashi ............ H04W 36/20
11,139,878 B2 * 10/2021  Wang .................... H04B 7/0404
(Continued)

FOREIGN PATENT DOCUMENTS

CN  108111268 A  6/2018
CN  108111272 A  6/2018
(Continued)

OTHER PUBLICATIONS

International Search Report issued Jun. 5, 2019 in PCT/CN2018/108112 filed Sep. 27, 2018, 2 pages.
(Continued)

*Primary Examiner* — Dung B Huynh
(74) *Attorney, Agent, or Firm* — Oblon, McClelland, Maier & Neustadt, L.L.P.

(57) ABSTRACT

Aspects of the disclosure provide a method for measurement configuration, which belong to the field of communication technology. The method can include transmitting measurement configuration information to a terminal, wherein the measurement configuration information includes at least one measurement resource and antenna panel identification information corresponding to each of the at least one measurement resource, the measurement resource including an SRS resource or an SRS resource group. The method can further include receiving the SRS from each terminal over each SRS resource, wherein the SRS is transmitted over an antenna panel indicated by the antenna panel identification information, and measuring the SRS transmitted by the terminal, selecting at least one SRS based on a measurement result, and transmitting uplink transmission indication information corresponding to an SRS of the at least one SRS to the terminal.

20 Claims, 6 Drawing Sheets (51) Int. Cl.
*H04W 72/044* (2023.01)
*H04W 72/21* (2023.01)

(56) References Cited

U.S. PATENT DOCUMENTS

| | | | | |
|---|---|---|---|---|
| 11,265,050 | B2* | 3/2022 | Park | H04L 5/0007 |
| 11,284,246 | B2* | 3/2022 | Huang | H04B 7/0639 |
| 11,641,258 | B2* | 5/2023 | Guo | H04W 72/21 |
| | | | | 370/336 |
| 11,729,782 | B2* | 8/2023 | Zhang | H04W 52/242 |
| | | | | 370/336 |
| 11,729,803 | B2* | 8/2023 | Xu | H04L 1/189 |
| | | | | 370/329 |
| 2014/0341192 | A1* | 11/2014 | Venkob | H04W 52/0216 |
| | | | | 370/336 |
| 2015/0141040 | A1* | 5/2015 | Jung | H04W 24/08 |
| | | | | 455/456.1 |
| 2017/0134976 | A1* | 5/2017 | Uchino | H04W 16/32 |
| 2018/0049214 | A1* | 2/2018 | Kubota | H04W 72/1268 |
| 2018/0124612 | A1* | 5/2018 | Babaei | H04W 72/23 |
| 2018/0205440 | A1 | 7/2018 | Enescu et al. | |
| 2018/0206132 | A1* | 7/2018 | Guo | H04B 7/0695 |
| 2018/0227094 | A1* | 8/2018 | Liu | H04B 7/06966 |
| 2018/0323855 | A1* | 11/2018 | Noh | H04B 7/0617 |
| 2019/0090227 | A1* | 3/2019 | Tsai | H04W 72/27 |
| 2019/0109679 | A1* | 4/2019 | Liu | H04B 7/0404 |
| 2019/0281588 | A1* | 9/2019 | Zhang | H04B 7/0617 |
| 2019/0327717 | A1 | 10/2019 | Li et al. | |
| 2019/0364561 | A1* | 11/2019 | Xiong | H04W 76/27 |
| 2020/0014448 | A1* | 1/2020 | Osawa | H04B 7/088 |
| 2020/0053588 | A1 | 2/2020 | Liu | |
| 2020/0100193 | A1* | 3/2020 | Cheng | H04W 52/146 |
| 2020/0145062 | A1* | 5/2020 | Jung | H04W 72/23 |
| 2020/0162133 | A1* | 5/2020 | Harrison | H04W 52/248 |
| 2020/0162289 | A1* | 5/2020 | Ahn | H04L 5/0053 |
| 2020/0177416 | A1 | 6/2020 | Jiang et al. | |
| 2020/0204225 | A1* | 6/2020 | Huang | H04B 7/0469 |
| 2020/0228267 | A1* | 7/2020 | Park | H04L 5/0094 |
| 2020/0296736 | A1* | 9/2020 | Yokomakura | H04W 72/12 |
| 2020/0351127 | A1* | 11/2020 | Yokomakura | H04L 5/0055 |
| 2020/0389872 | A1* | 12/2020 | Osawa | H04W 72/12 |
| 2021/0022055 | A1* | 1/2021 | Tseng | H04W 76/27 |
| 2021/0058209 | A1* | 2/2021 | Qin | H04L 5/0023 |
| 2021/0153215 | A1* | 5/2021 | Guan | H04L 67/303 |
| 2021/0159966 | A1* | 5/2021 | Xi | H04B 7/088 |
| 2021/0167821 | A1* | 6/2021 | Chen | H04B 7/0617 |
| 2021/0168714 | A1* | 6/2021 | Guan | H04B 7/0404 |
| 2021/0226689 | A1* | 7/2021 | Farag | H04W 24/10 |
| 2021/0314049 | A1* | 10/2021 | Matsumura | H04W 76/19 |
| 2021/0320774 | A1* | 10/2021 | Park | H04L 5/0053 |
| 2021/0336737 | A1* | 10/2021 | Li | H04L 5/0094 |
| 2021/0345253 | A1* | 11/2021 | Matsumura | H04B 7/0404 |
| 2022/0022193 | A1* | 1/2022 | Zhang | H04W 72/23 |
| 2022/0095382 | A1* | 3/2022 | Tsai | H04W 68/025 |
| 2022/0123821 | A1* | 4/2022 | Sakhnini | H04B 7/0874 |
| 2022/0167274 | A1* | 5/2022 | Wang | H04W 52/0235 |
| 2022/0210825 | A1* | 6/2022 | Zhu | H04W 74/002 |
| 2022/0256359 | A1* | 8/2022 | Awoniyi-Oteri | H04B 7/0608 |
| 2022/0256381 | A1* | 8/2022 | Bai | H04W 72/1263 |

FOREIGN PATENT DOCUMENTS

| | | |
|---|---|---|
| CN | 108260133 A | 7/2018 |
| CN | 108282297 A | 7/2018 |
| CN | 108401264 A | 8/2018 |
| CN | 105821878 A | 9/2018 |
| CN | 108632839 A | 10/2018 |
| WO | WO 2017/192889 A1 | 11/2017 |
| WO | WO 2018/143776 A1 | 8/2018 |

OTHER PUBLICATIONS

Combined Chinese Office Action and Search Report issued Mar. 25, 2022 in Patent Application No. 201880001508.X (with English language translation), 10 pages.

Satoshi Yamaguchi, et al., "Development of Active Phased Array Antenna for High SHF Wideband Massive MIMO in 5G," 2017 IEEE International Symposium on Antennas and Propagation & USNC/URSI National Radio Science Meeting, 2017, pp. 1463-1464.

Huawei, et al., "Antenna Selection for PUSCH," 3GPP TSG RAN WG1 Meeting #92bis R1-1804447, Apr. 2018, 6 pages.

Samsung, "Discussions on NR UL multi-TRP and multi-panel support," 3GPP TSG RAN WG1 Meeting #89 R1-1707949, May 2017, 3 pages.

Gao Cheng, et al., "Standardization Progress of Massive MIMO," Journal of CAEIT, vol. 13, No. 1, Feb. 2018, 15 pages (with English language translation).

Combined Chinese Office Action and Search Report Issued Jun. 3, 2021 in Chinese Patent Application No. 201880001508.X (with English translation), 19 pages.

Huawei, HiSilicon, "Beam measurement, reporting and indication", 3GPP TSG RAN WG1 Meeting #91 R1-1719422, Dec. 1, 2017, pp. 1-11.

Zte, "Remaining issues on beam management", 3GPP TSG RAN WG1 Meeting #93 R1-1805828, May 25, 2018, pp. 1-7.

Chinese Office Action dated Jun. 27, 2024, issued in Chinese Patent Application No. 202210570670.1 (with English translation).

* cited by examiner

MEASUREMENT CONFIGURATION METHOD, APPARATUS, DEVICES, SYSTEM, AND STORAGE MEDIUM

CROSS-REFERENCE TO RELATED APPLICATIONS

This Application is a National Phase Application of PCT International Application No. PCT/CN2018/108112, filed on Sep. 27, 2018, the entire content of which is incorporated herein by reference.

TECHNICAL FIELD

The present disclosure relates to the field of communication technologies, including to a measurement configuration method, apparatus, devices system, and storage medium.

BACKGROUND

When communication is carried out in a frequency range 2 (above 6 GHz), these high-frequency signals can attenuate quickly during transmission.

SUMMARY

In order to solve the problems, the present disclosure provides a measurement configuration method, apparatus, devices system, and storage medium.

According to a first aspect of the disclosure, a method for measurement configuration is provided. The method can include transmitting measurement configuration information to a terminal, wherein the measurement configuration information includes at least one measurement resource and at least one piece of antenna panel identification information corresponding to the at least one measurement resource, the measurement resource including a sounding reference signal (SRS) resource or an SRS resource group. The method can further include receiving the SRSs transmitted by the terminal over SRS resources, wherein each of the SRSs is transmitted by the terminal over each of the SRS resources, and measuring the SRSs from the terminal, selecting at least one SRS based on the measurement result, and transmitting uplink transmission indication information corresponding to an SRS identifier (ID) of the at least one SRS to the terminal. The terminal is operable to determine the SRS ID corresponding to the uplink transmission indication information, and perform uplink transmission over a transmit beam corresponding to the SRS ID, or perform uplink transmission over a transmit beam and an antenna panel which correspond to the SRS ID.

According to a second aspect of the disclosure, a method for measurement configuration is provided. The method can be implemented by a terminal and include receiving measurement configuration information from an access network device, wherein the measurement configuration information includes at least one measurement resource and at least one piece of antenna panel identification information corresponding to the at least one piece of measurement resource, the measurement resource including a sounding reference signal (SRS) resource or an SRS resource group. The method can further include transmitting the SRSs to the access network device over SRS resources, wherein each of the SRS resources is transmitted by the terminal over each of the SRS resources, and receiving at least one piece of uplink to transmission indication information from the access network device, determining an SRS identifier (ID) corresponding to the uplink transmission indication information, and performing uplink transmission over a transmit beam corresponding to the SRS ID, or performing uplink transmission over a transmit beam and an antenna panel which correspond to the SRS ID. The uplink transmission indication information is determined based on the SRS ID of at least one SRS which is selected by the network access device based on a measurement result of measuring SRSs transmitted by the terminal.

According to a third aspect of the embodiments of the present disclosure, an access network device is provided. The network device can include a first processor and a first memory for storing at least one instruction executable by the first processor. The first processor, when executing the at least one instruction, is caused to perform the method according to the first aspect of embodiments of the present disclosure.

According to a fourth aspect of the disclosure, a terminal is provided. The terminal includes a second processor and a second memory for storing at least one instruction executable by the second processor. The second processor, when executing the at least one instruction, is caused to perform a method for measurement configuration. The method can include receiving measurement configuration information from an access network device, wherein the measurement configuration information includes at least one measurement resource and at least one antenna panel identification information corresponding to the at least one measurement resource, the measurement resource including a sounding reference signal (SRS) resource or SRS resource group. The method can further include transmitting an SRS to the access network device over each of the SRS resources, wherein the SRS is transmitted over an antenna panel indicated by the antenna panel identification information, and receiving at least one piece of uplink transmission indication information from the access network device, determine an SRS identifier (ID) corresponding to the uplink transmission indication information, and perform uplink transmission over a transmit beam corresponding to the SRS ID, or perform uplink transmission over a transmit beam and an antenna panel which correspond to the SRS ID. The uplink transmission indication information is determined based on the SRS ID of at least one SRS which is selected by the network access device based on a measurement result of measuring SRSs transmitted by the terminal.

According to a fifth aspect of the embodiments of the present disclosure, a mobile communication system is provided. The system includes any apparatus for measurement configuration according to the above third aspect, and any apparatus for measurement to configuration according to the above fourth aspect, or includes any access network device according to the above fifth aspect and any terminal according to the above sixth aspect.

According to an sixth aspect of the disclosure, a non-transitory computer-readable storage medium is provided. The non-transitory computer-readable storage medium stores at least one instruction, at least one program, a code set, or an instruction set. The at least one instruction, the at least one program, the code set, or the instruction set, when loaded and executed by a processor, causes the processor to perform the method for measurement configuration according to the first aspect, or perform the method for measurement configuration according to the second aspect.

It should be understood that the above general description and the following detailed description are only exemplary and cannot limit the present disclosure.

BRIEF DESCRIPTION OF THE DRAWINGS

The accompanying drawings, which are incorporated in and constitute a part of the description, illustrate exemplary embodiments of the present disclosure and, together with the description thereof, serve to explain the principles of the present disclosure.

DETAILED DESCRIPTION

Exemplary embodiments are described in detail here, examples of which are illustrated in the accompanying drawings. Where the following description hereinafter refers to the accompanying drawings, the same numbers in different drawings represent the same or is similar elements, unless otherwise represented. The embodiments set forth in the following description of exemplary embodiments do not represent all embodiments consistent with the present disclosure. Instead, they are merely examples of apparatuses and methods consistent with some aspects related to the present disclosure as recited in the appended claims.

The terms involved in the respective embodiments of the present disclosure are explained below.

The beam is divided into a transmit beam and a receive beam. Herein, the transmit beam may also be referred to as an uplink beam for the terminal to perform uplink transmission. The receive beam may also be referred to as a downlink beam for the terminal to perform downlink reception.

The antenna panel may be divided into a transmit antenna panel and a receive antenna panel which correspond to the above two beams, The antenna panel operable to transmit signals in a direction of the transmit beam is referred to as the transmit antenna panel, and the antenna panel operable to receive signals in a direction of the receive beam is referred to as the receive antenna panel.

The technical solutions according to the embodiments of the present disclosure may achieve beneficial effects. For example, each measurement resource in the measurement configuration information corresponds to one piece of antenna panel identification information, such that the terminal is capable of transmitting the SRS over the SRS resource by the antenna panel indicated by each piece of antenna panel identification information. In this way, the access network device can know which SRSs can be transmitted at the same time, that is, the SRSs transmitted by different antenna panels can be transmitted at the same time. Therefore, the transmit beams corresponding to these SRSs that can be transmitted at the same time are configured for the terminal, and these transmit beams are configured for uplink transmission, or the transmit beams and antenna panels which correspond to these SRSs that can be transmitted at the same time are configured for the terminal, and the transmit beams of these antenna panels are configured for uplink transmission, thereby improving the robustness of communication.

The transmit antenna panel and the receive antenna panel may be two independent to antenna panels, or may be located on the same antenna panel, which is not limited in the present embodiment. Because the terminal has the functions of transmitting and receiving signals at the same time, for the antenna panel configured in the terminal described below, unless otherwise specified, one antenna panel includes one transmit antenna panel and one receive panel, or one antenna panel is referred to as an antenna panel including the transmit antenna. panel and the receive antenna panel.

In the related art, if only one antenna panel is configured in the terminal, then the terminal can only receive the signals in a direction of one receive beam of the antenna panel at the same time, and can also only transmit the signals in a direction of one transmit beam of the antenna panel at the same time, leading to poor robustness of communication.

Figure 1:
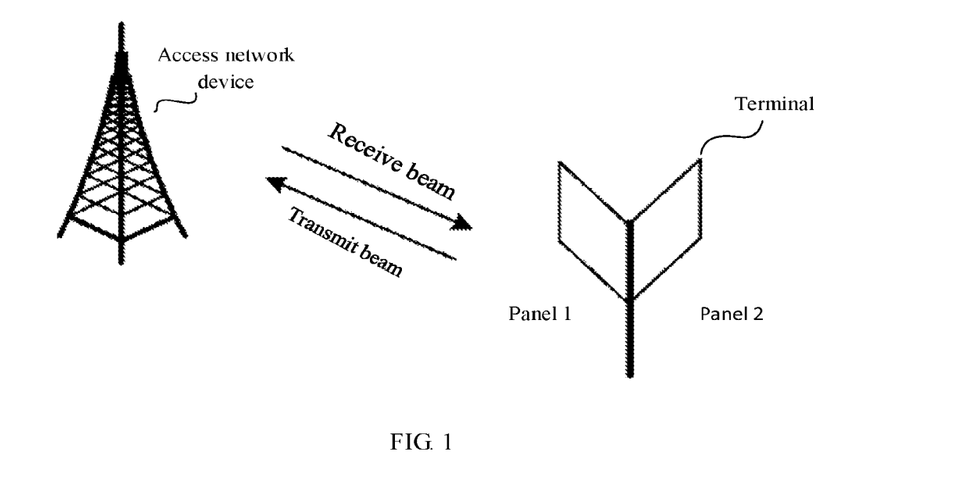
FIG. 1 is a schematic diagram of a base station and a terminal.

In order to improve the robustness of communication, it may be considered to configure at least two antenna panels in the terminal. Assuming that the terminal is provided with N (N≥2) antenna panels therein, then the terminal may receive the signals in directions of N receive beams at the same time, that is, receive the signals in a direction of one of the receive beams on each antenna panel, and transmit the signals in directions of N transmit beams, that is, transmit the signals in a direction of one of the transmit beams on each antenna panel. Referring to FIG. 1, a schematic diagram of the interaction between a terminal provided with two antenna panels and an access network device is shown. However, FIG. 1 only shows a transmit beam and a receive beam of panel I, and does not show a transmit beam and a receive beam of panel 2.

In order to improve the robustness of communication, it may be considered to transmit and receive the signals over at least two antenna panels. By taking uplink transmission as an example, the access network device may configure the two antenna panels of the terminal to transmit sounding reference signal (SRSs) over their respective transmit beams, and then the transmit beams are selected and allocated for the terminal based on measurement results of the SRSs transmitted by the two antenna panels. The transmit beam is operable to transmit a physical uplink shared channel (PUSCH) or a physical uplink control channel (PUCCH) or the SRS; or, based on the measurement result of each SRS from each antenna panel, the transmit beam and the transmit antenna panel are selected and allocated for the terminal, and the transmit beam and the transmit antenna panel are operable to transmit the PUSCH or PUCCH or SRS. During measurement of the SRS, the access network device needs to know which SRSs are from the same antenna panel, which SRSs are from different antenna panels, and which SRSs from different antenna panels can be transmitted at the same time, so as to configure the appropriate transmit beams for the terminal based on such information. However, the access network device to in the related art cannot acquire such information.

In the present embodiment, because each measurement resource in measurement configuration information corresponds to one piece of antenna panel identification information, the terminal is capable of transmitting the SRR over the SRS resource by the antenna panel indicated by each piece of antenna panel identification information In this way, the access is network device may know which SRSs can be transmitted at the same time, that is, the SRSs from different antenna panels can be transmitted at the same time. Therefore, the transmit beams corresponding to these SRSs that can be transmitted at the same time are configured for the terminal, and these transmit beams are operable to transmit the uplink PUSCH or PUCCH or SRS; or, the transmit beams and antenna panels which correspond to these SRSs that can be transmitted at the same time are configured for the terminal, and the transmit beams of these antenna panels are operable to transmit the uplink PUSCH, PUCCH or SRS, thereby improving the robustness of communication.

Figure 2:
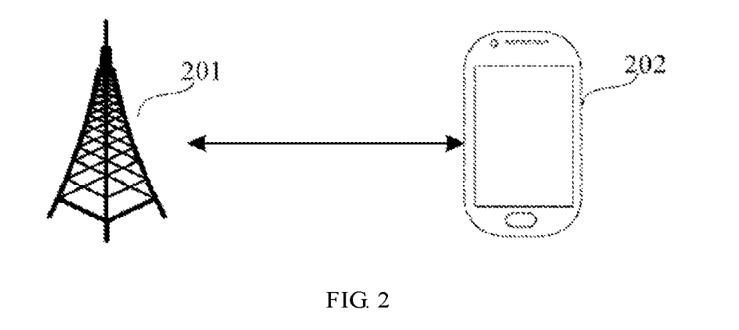
FIG. 2 is a schematic diagram of a mobile communication system involved in respective embodiments of the present disclosure.

FIG. 2 shows a schematic structural diagram of a mobile communication system according to an embodiment of the present disclosure. The mobile communication system may be a fifth-generation mobile communication network technology (5G) system, also known as a new radio (NR) system. The mobile communication system includes an access network device 201 and a terminal 202.

The access network device 201 may be a base station. For example, the base station may be a next generation NodeB (gNB) that adopts a centralized distributed architecture in a 5G system. When adopting the centralized distributed architecture, the access network device 201 usually includes a central unit (CU) and at least two distributed units (DU). The central unit is provided with a protocol stack of a packet data convergence protocol (PDCP) layer, a radio link control (RLC) protocol layer, and a media access control (MAC) layer therein. The distributed unit is provided with a protocol stack of a physical (PHY) layer therein. The embodiment of the present disclosure does not limit the specific implementation of the access network device 201. Optionally, the access network device 201 may also include a home eNB (HeNB), a relay, a pico base station (Pico), and the like.

The access network device 201 and the terminal 202 establish a wireless connection over a wireless air interface. Optionally, the wireless air interface is a wireless air interface based on the 5G standard. For example, the wireless air interface is an NR or the wireless air interface may also be a wireless air interface based on the next generation mobile communication network technology standard of 5G.

The terminal 202 may be a device that provides voice and/or data communicability to users. The terminal 202 may communicate with one or more core networks via a radio access network (RAN). The terminal 202 may be a mobile terminal like a mobile phone (or a cellular phone) and a computer with a mobile terminal, for example, a portable, pocket-sized, handheld, computer built-in or vehicle-mounted mobile device, such as a subscriber unit, a subscriber station, a mobile station, a mobile pad, a remote station, an access point, a remote terminal, an access terminal, a user terminal, a user agent, a user device, or user equipment.

It should be noted that the mobile communication system shown in FIG. 2 may including a plurality of access network devices 201 and/or a plurality of terminals 202. FIG. 2 shows one access network device 201 and one terminal 202 as an example for illustration, which is not limited by the present embodiment.

Figure 3:
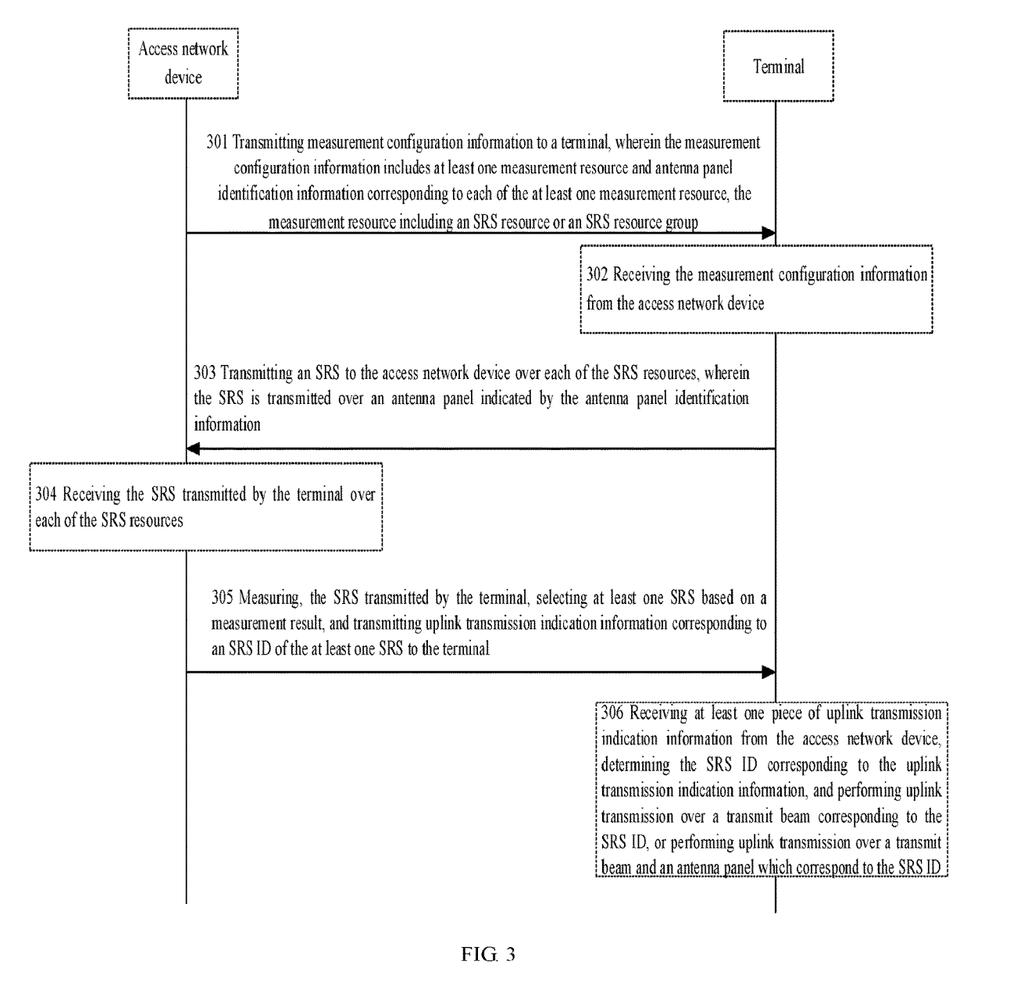
FIG. 3 is a flowchart of a method for measurement configuration according to an exemplary embodiment.

FIG. 3 is a flowchart of a method for measurement configuration according to an exemplary embodiment, The method for measurement configuration is applicable to the mobile communication system shown in FIG. 2. As shown in FIG. 3, the method for measurement configuration includes the following steps.

In step S301, the access network device transmits measurement configuration information to the terminal. The measurement configuration information includes at least one measurement resource and at least one antenna panel identification information corresponding to the at least one measurement resource. The measurement resource includes an SRS resource or an SRS resource group.

In step S302, the terminal receives the measurement configuration information from the access network device.

In step S303, the terminal transmits an SRS to the access network device over each of the SRS resources, and the SRS is transmitted over an antenna panel indicated by the antenna panel identification information.

In step S304, the access network device receives the SRS transmitted by the terminal over each of the SRS resources.

In step S305, the access network device measures the SRS from the terminal, selects at least one SRS based on a measurement result, and transmits uplink transmission indication information corresponding to an SRS identifier (ID) of the at least one SRS to the terminal.

In step 306, the terminal receives at least one piece of uplink transmission indication information from the access network device, determines the SRS ID corresponding to to the uplink transmission indication information, and performs uplink transmission over a transmit beam corresponding to the SRS ID, or performs uplink transmission over a transmit beam and an antenna panel which correspond to the SRS ID.

The steps S301, S304, and S305 may be separately implemented as an embodiment on the side of the access network device, and steps S302, S303, and S306 may be separately implemented as an embodiment on the side of the terminal.

In summary, in the method for measurement configuration according to the present disclosure, each measurement resource in the measurement configuration information corresponds to one piece of antenna panel identification information, such that the terminal is capable of transmitting the SRS over the SRS resource by the antenna panel indicated by each piece of antenna panel identification information. In this way, the access network device can know which SRSs can be transmitted at the same time, that is, the SRSs transmitted from different antenna panels can be transmitted at the same time. Therefore, the transmit beams corresponding to these SRSs that can be transmitted at the same time are configured for the terminal, and these transmit beams are operable to transmit the uplink PUSCH or PUCCH air SRS, or the transmit beams and antenna panels which correspond to these SRSs that can be transmitted at the same time are configured for the terminal, and the transmit beams of these antenna panels are operable to transmit the uplink PUSCH or PUCCH or SRS, thereby improving the robustness of communication.

Figure 4:
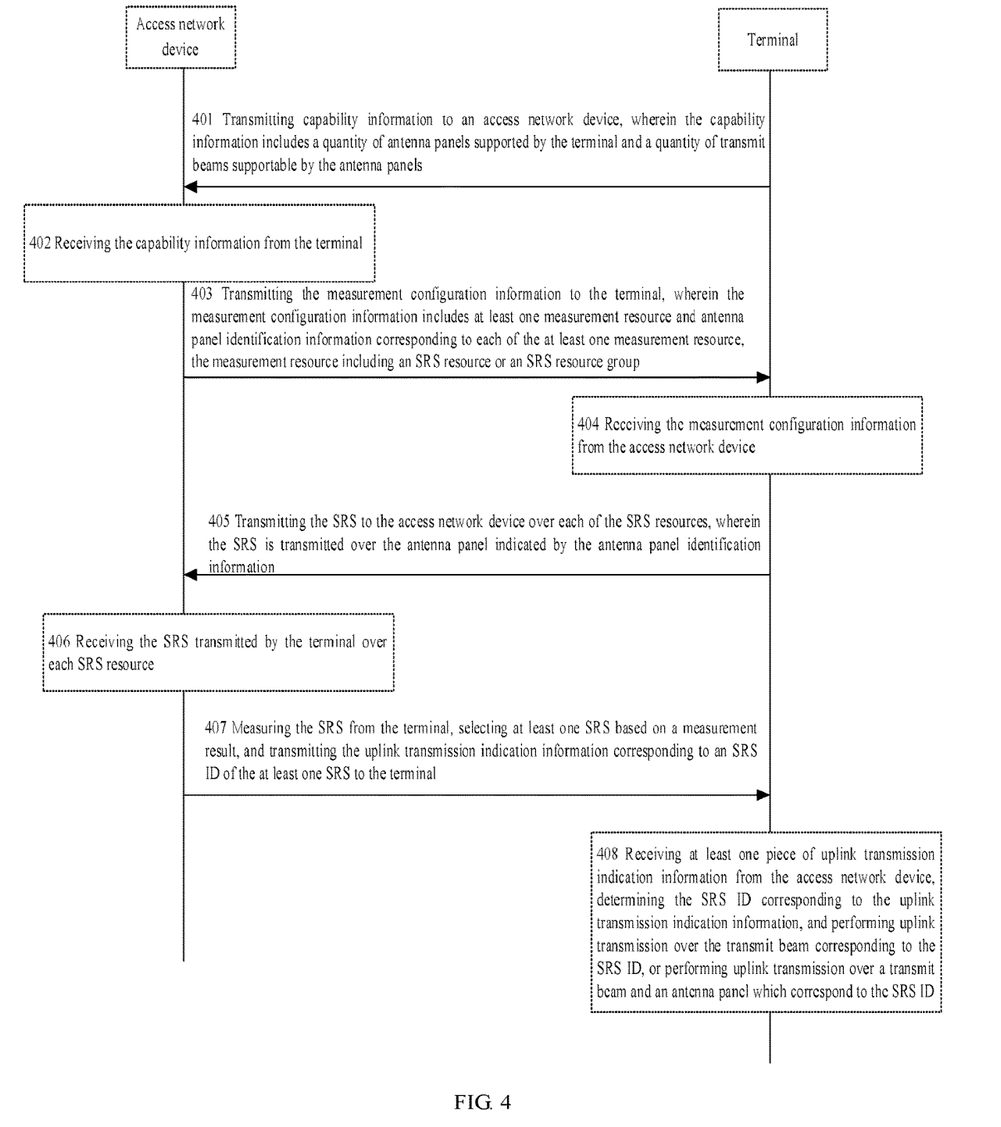
FIG. 4 is a flowchart of a method for measurement configuration according to an exemplary embodiment.

FIG. 4 is a flowchart of a method for measurement configuration according to another exemplary embodiment. The method for measurement configuration is applicable to the mobile communication system shown in FIG. 2. As shown in FIG. 4, the method for measurement configuration includes the following steps.

In step S401, the terminal transmits capability information to the access network device. The capability information includes the quantity of antenna panels supported by the terminal and the quantity of transmit beams supportable by the antenna panels. The capability information is information for indicating a capability of the terminal. The capability information in the present embodiment at least includes the quantity of antenna panels supported by the terminal and the quantity of transmit beams supportable by the antenna panels. The present embodiment does not limit whether the capability information includes other information.

The quantity of antenna panels may include the quantity of transmit antenna panels, and may also include the quantities of transmit antenna panels and receive antenna panels, It should be noted that when the quantity of transmit antenna panels is equal to the quantity of receive antenna panels, the quantity of antenna panels may include the quantity of transmit antenna panels or the quantity of receive antenna panels, or the quantity of antenna panels can be indicated, instead of indicating whether the antenna panels are the transmit antenna panels or the receive antenna panels. The quantity of transmit beams is the maximum quantity of transmit beams supportable by the antenna panel.

In the present embodiment, the capability information further includes a reciprocity indication. The reciprocity indication indicates whether the terminal can learn the direction of an optimal transmit beam from the direction of an optimal receive beam, that is, whether the transmit beam corresponding to the receive beam with the optimal received signal is the best transmit beam.

In step S402, the access network device receives the capability information from the terminal. If the capability information includes the reciprocity indication, when the reciprocity indication indicates that the terminal can learn the direction of the optimal transmit beam from the direction of the optimal receive beam, the access network device may directly determine the optimal transmit beam from the direction of the optimal receive beam, and configure the optimal transmit beam for the terminal, and end the process, If the capability information does not include the reciprocity indication, or if the capability information includes the reciprocity indication, when the reciprocity indication indicates that the terminal may not learn the direction of the optimal transmit beam from the direction of the optimal receive beam, the access network device generates measurement configuration information according to the quantity of antenna panels and the quantity of transmit beams supported by the antenna panels, that is, performs steps S403 to S408 to configure the transmit beams for the terminal.

In step S403, the access network device transmits the measurement configuration information to the terminal. The measurement configuration information includes at least one measurement resource and at least one antenna panel identification information corresponding to the at least one measurement resource. The at least one measurement resource includes an SRS resource or an SRS resource group.

The SRS resource is a time-frequency resource configured by the access network device for the terminal to transmit the SRS, and the terminal may transmit the SRS over each of the SRS resources.

The access network device may configure the measurement resource in units of the SRS resource. In this case, the measurement configuration information includes at least one to SRS resource and the antenna panel identification information corresponding to each SRS resource. The access network device may also configure the measurement resource in units of the SRS resource group. In this case, the measurement configuration information includes at least one SRS resource group and the antenna panel identification information corresponding to each SRS resource group, and each SRS resource group includes at least one SRS resource. The antenna panel identification information indicates an antenna panel in the terminal.

It should be noted that the quantities of measurement resources and antenna panel identification information included in the measurement configuration information may be determined according to business requirements. For example, if the access network device wants to measure the transmit beam of a certain antenna panel, then the measurement configuration information may include at least one measurement resource and one piece of antenna panel identification information corresponding to all measurement resources. If the access network device wants to measure the transmit beam in one of the directions of each antenna panel, the measurement configuration information may include at least two measurement resources and one piece of antenna panel identification information corresponding to each measurement resource, and all pieces of antenna panel identification information are different. If the access network device wants to measure the transmit beams of multiple antenna panels in multiple directions, the measurement configuration information may include at least one measurement resource and at least one antenna panel identification information corresponding to the at least one measurement resource. The present embodiment does not limit the quantities of measurement resources and antenna panel identification information.

The antenna panel identification information is introduced below.

1) In a first implementation, the antenna panel identification information indicates any one antenna panel in the terminal, and the SRS transmitted over the measurement resource corresponding to the same antenna panel identification information is transmitted over the same antenna panel.

The SRS transmitted over the measurement resource corresponding to the same antenna panel identification information is transmitted by the same antenna panel, without assigning which antenna panel in the terminal transmits the SRS.

The quantities of measurement resources corresponding to the at least one piece of antenna panel identification information may be equal. That is, when the measurement resource is an SRS resource, the quantities of SRS resources corresponding to the same antenna panel identification information are equal. When the measurement resource is an SRS resource group, to and each of the SRS resource groups corresponds to one of the at least one piece of antenna panel identification information, the quantities of SRS resources in the SRS resource groups are equal.

Assuming that two antenna panels are configured in the terminal, the measurement configuration information includes six SRS resources, wherein three SRS resources correspond to antenna panel identification information 1, and the other three SRS resources correspond to antenna panel identification information 2; then the terminal may be instructed to transmit, using the transmit beam of antenna panel 1, the SRS over the three SRS resources corresponding to the antenna panel identification information 1 respectively, and transmit, using the transmit beam of antenna panel 2, the SRS over the three SRS resources corresponding to the antenna panel identification information 2 respectively; or the terminal may also be instructed to transmit, using the transmit beam of the antenna panel 2, the SRS on the three SRS resources corresponding to the antenna panel identification information 1 respectively, and transmit, using the transmit beam of the antenna panel 1, the SRS over the three SRS resources corresponding to the antenna panel identification information 2 respectively. Assuming that two antenna panels are configured in the terminal, the measurement configuration information includes two SRS resource groups, and each SRS resource group includes three SRS resources, the first SRS resource group corresponds to the antenna panel identification information 1, and the second SRS resource group corresponds to the antenna panel identification information 2; then the terminal may be instructed to transmit, using the transmit beam of the antenna panel 1, the SRS over the three SRS resources in the first SRS resource group respectively, and transmit, using the transmit beam of the antenna panel 2, the SRS over the three SRS resources in the second SRS resource group respectively; or, the terminal may be instructed to transmit, using the transmit beam of the antenna panel 2, the SRS over the three SRS resources in the first SRS resource group respectively, and transmit, using the transmit beam of the antenna panel 1, the SRS over the three SRS resources in the second SRS resource group respectively.

2) In a second implementation, the antenna panel identification information indicates a fixed antenna panel in the terminal. Each piece of antenna panel identification information corresponds to a designated antenna panel in the terminal. For example, the antenna panel identification information 1 indicates the antenna panel 1 in the terminal, and the antenna panel identification information 2 indicates the antenna panel 2 in the terminal.

a) The quantities of measurement resources corresponding to the at least one piece of antenna panel identification information are equal. That is, when the measurement resource is an SRS resource, the quantities of SRS resources corresponding to the same antenna panel identification information are equal. When the measurement resource is an SRS resource group, and each of the SRS resource groups corresponds to one of the at least one piece of antenna panel identification information, the quantities of SRS resources in the SRS resource groups are equal.

b) The antenna panel identification information includes one piece of first antenna panel identification information and at least one piece of second antenna panel identification is information, and the quantity of measurement resources corresponding to the first antenna panel identification information is greater than the quantity of measurement resources corresponding to the second antenna panel identification information. That is, when the measurement resource is an SRS resource, the quantity of SRS resources corresponding to the first antenna panel identification information is the largest. When the measurement resource is an SRS resource group, and each of the SRS resource groups corresponds to one of the at least one piece of antenna panel identification information, the quantity of SRS resources in the SRS resource group corresponding to the first antenna panel identification information is the largest.

It should be noted that the access network device may acquire location information of the terminal. When it is determined that the direction of the access network device matches the direction of one antenna panel in the terminal, the transmit beam in such direction is optimal. Therefore, the access network device may determine the antenna panel identification information indicating the antenna panel as the first antenna panel identification information, and determine the antenna panel identification information indicating other antenna panels as the second antenna panel identification information. That is, the first antenna panel identification information indicates the antenna panel whose direction matches the direction of the access network device.

The matching of the direction of the antenna panel and the direction of the access network device means that the antenna panel is opposite to the direction of the access network device. For example, if the access network device is disposed on the left side of the terminal, it can be determined that the direction of the antenna panel directly facing the left side in the terminal matches the direction of the access network device.

After the first antenna panel identification information is determined, the access network device may configure N SRS resources for the first antenna panel, and M SRS resources for the remaining antenna panels, wherein N>M, such that the probability of determining the optimal beam is improved.

In the present embodiment, the antenna panel identification information may have two representation forms.

The first representation form is the antenna panel identification information carries an antenna panel identifier of a fixed antenna panel, and the antenna panel identifier indicates the fixed antenna panel. For example, if the antenna panel identifier of the antenna panel 1 in the terminal is identification 1, the antenna panel identifier of the antenna panel 2 is identification 2, and then the antenna panel identification information may be the identification 1 and identification 2.

If the antenna panel identification information includes the first antenna panel identification information, and the antenna panel identification information carries the antenna panel identifier, then the method further includes: transmitting, by the terminal, a downlink beam measurement report to the access network device, wherein the beam measurement report includes at least two reference signal (RS) identifications, layer-1 reference signal received power (L1-RSRP) corresponding to each RS identifier, and the antenna panel identification information corresponding to each RS identifier; receiving, by the access network device, the downlink beam measurement report from the terminal; and determining, by the access network device, an RS identifier corresponding to a largest L1-RSRP, and determining the antenna panel identifier corresponding to the RS identifier as the first antenna panel identification information, wherein the antenna panel identifier corresponding to the RS identifier is the identifier of the antenna panel used when the RS corresponding to the RS identifier is received and measured.

The RS may be a synchronization signal block (SSB) or a channel state information reference signal (CSI-RS) transmitted by the access network device for downlink beam measurement, which is not limited by the present embodiment.

The terminal may report a downlink beam measurement result based on groups, wherein a plurality of ways are available for reporting the result based on groups. For example, the terminal determines the RSs that cannot be received at the same time over one antenna panel as a group, indicating that these RSs are received over the same antenna panel, and then the beam measurement report includes the RS identifier group and the antenna panel identifier corresponding to the RS identifier group.

Because the antenna panel corresponding to the receive beam optimal in receiving the RS has good capabilities, the access network device may determine the antenna panel that transmits the RS, and determine the antenna panel identifier for indicating the antenna panel as the first antenna panel identification Information, and determine the antenna panel identifiers for indicating other antenna panels as the second antenna panel identification information. The access network device reconfigures measurement resources to generate the measurement configuration information.

The second representation form is: the antenna panel identification information indicates the RS identifier of the RS, and the RS identifier indicates the antenna panel corresponding to one transmit beam of the terminal, that is, instructing the terminal to transmit the SRS over the antenna panel used when the RS corresponding to the RS identifier is transmitted; or the RS identifier indicates the antenna panel corresponding to one receive beam of the terminal, that is, indicates the terminal to transmit the SRS over the antenna panel used when the RS corresponding to the RS identifier is received.

When the RS is an SRS, the RS identifier indicates the antenna panel corresponding to one transmit beam of the terminal, that is, instructing the terminal to transmit the SRS over the antenna panel used when the SRS corresponding to the SRS identifier is transmitted. When the RS is an SSB or CSI-RS, the RS identifier indicates the antenna panel corresponding to one receive beam of the terminal, that is, indicates the terminal to use the antenna panel used when the SSB or CSI-RS corresponding to the RS identifier is received to transmit the SRS.

If the antenna panel identification information includes the first antenna panel identification information, the antenna panel identification information indicates the RS identifier, and the RS identifier includes an SSB index or a CSI-RS ID, the method further includes: transmitting, by the terminal, a downlink beam measurement report to the access network device, the downlink beam measurement report including at least two RS identifiers and L1-RSRP corresponding to each RS identifiers; receiving, by the access network device, the downlink beam measurement report from the terminal; and determining, by the access network device, the RS identifier corresponding to the largest L1-RSRP as the first antenna panel identification information.

Because the antenna panel corresponding to the receive beam optimal in receiving the RS has good capabilities, the access network device can determine the RS and determine the RS identifier as the first antenna panel identification information, and determine the RS identifiers of other RSs not received by the antenna panel receiving such RS as the second antenna panel identification information. The access network device reconfigures measurement resources to generate the measurement configuration information.

If the antenna panel identification information includes the first antenna panel identification information, the antenna panel identification information indicates the RS identifier, and the RS identifier includes the SRS identifier, then the method further includes: determining, by the access network device, the SRS identifier with a better measurement result as the first antenna panel identification information based on the measurement result of the SRS transmitted by the terminal over the SRS resource before, and determining the SRS identifiers of other SRSs not transmitted over the antenna panel transmitting such SRS as the second antenna panel identification information. The access network device reconfigures measurement resources and generate the measurement configuration information.

In step S404, the terminal receives the measurement configuration information from the access network device.

In step S405, the terminal transmits the SRS to the access network device over each of the SRS resources, and the SRS is transmitted by the antenna panel indicated by the antenna panel identification information. Time-domain positions of the SRS resources corresponding to the same antenna panel identification information are different, and the time-domain positions of the SRS resources corresponding to different antenna panel identification information may be the same.

In step S406, the access network device receives the SRS transmitted by the terminal over each of the SRS resources.

In step S407, the access network device measures the SRS transmitted by the terminal, selects at least one SRS based on a measurement result, and transmits the uplink transmission indication information corresponding to an SRS ID of the at least one SRS to the terminal. The uplink transmission indication information includes spatial relationship information. In this case, the uplink transmission indication information indicates parameters of the transmit beam; or, the uplink transmission indication information includes spatial relationship information and antenna panel identification information. In this case, the uplink transmission indication information indicates the parameters of the transmit beam and the antenna panel.

In step S408, the terminal receives at least one piece of uplink transmission indication information from the access network device, determines the SRS ID corresponding to the uplink transmission indication information, and performs uplink transmission over the transmit beam corresponding to the SRS ID, or performs uplink transmission over a transmit beam and an antenna panel which correspond to the SRS ID.

When the uplink transmission indication information includes spatial relationship information, because the spatial relationship information corresponds to one SRS ID, the terminal may perform uplink transmission over the transmit beam corresponding to the SRS ID, or the terminal may perform uplink transmission over the transmit beam and antenna panel which correspond to the SRS ID, that is, one of the transmit beams of the antenna panel is configured to for uplink transmission.

When the uplink transmission indication information includes spatial relationship information and antenna panel identification information, the terminal may perform uplink transmission over the transmit beam and the antenna panel which correspond to the SRS ID, because the spatial relationship information corresponds to one SRS ID, and the antenna panel is identification information corresponds to one antenna panel, that is, one of the transmit beams of the antenna panel is configured for uplink transmission.

It should be noted that when the antenna panel identification information indicates the RS identifier, the SRS ID in the spatial relationship information and the RS identifier indicated by the antenna panel identification information may be different, as long as the two correspond to the same antenna panel.

Steps S402, S403, S406, and S407 may be separately implemented as an embodiment on the side of the access network device, and steps S401, S404, S405, and S408 may be separately implemented as an embodiment on the side of the terminal.

In summary, in the method for measurement configuration according to the present disclosure, each measurement resource in the measurement configuration information corresponds to one piece of antenna panel identification information, such that the terminal is capable of transmitting the SRS over the SRS resource by the antenna panel indicated by each piece of antenna panel identification information. In this way, the access network device can know which SRSs can be transmitted at the same time, that is, the SRSs transmitted over different antenna panels can be transmitted at the same time. Therefore, the transmit beams corresponding to these SRSs that can be transmitted at the same time are configured for the terminal, and these transmit beams are operable to transmit the uplink PUSCH or PUCCH or SRS, or the transmit beams and antenna panels which correspond to these SRSs that can be transmitted at the same time are configured for the terminal, and the transmit beams of these antenna panels are operable to transmit the uplink PUSCH or PUCCH or SRS, thereby improving the robustness of communication.

Figure 5:
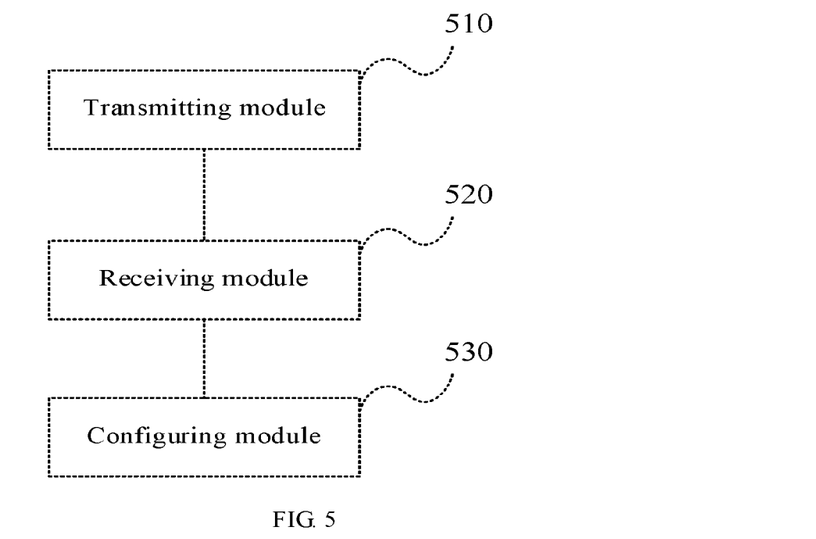
FIG. 5 is a block diagram of an apparatus for measurement configuration according to an exemplary embodiment.

FIG. 5 is a block diagram of an apparatus for measurement configuration according to an exemplary embodiment. The apparatus for measurement configuration is for applying to the access network device 201 shown in FIG. 2. As shown in FIG. 5, the apparatus for measurement configuration includes a transmitting module 510, a receiving module 520, and a configuring module 530. Of course, it should be understood that one or more of the modules described in this disclosure can be implemented by hardware, such as circuitry.

The transmitting module 510 is operable to transmit measurement configuration information to a terminal, wherein the measurement configuration information includes at least one measurement resource and antenna panel identification information corresponding to the at least one measurement resource, the measurement resource including an SRS resource or an SRS resource group.

The receiving module 520 is operable to receive an SRS transmitted by the terminal over each of the SRS resources, wherein the SRS is transmitted over an antenna panel indicated by the antenna panel identification information.

The configuring module 530 is operable to measure the SRS transmitted by the terminal, select at least one SRS based on a measurement result, and transmit uplink transmission indication information corresponding to an SRS ID of the at least one SRS to the terminal, wherein the terminal is operable to determine the SRS ID corresponding to the uplink transmission indication information, and perform uplink transmission over a transmit beam corresponding to the SRS ID, or perform uplink transmission over a transmit beam and an antenna panel which correspond to the SRS ID.

In an embodiment of the present disclosure, the antenna panel identification information indicates any one antenna panel in the terminal, and the SRS transmitted over the measurement resource corresponding to the same antenna panel identification information is transmitted by the same antenna panel.

In an embodiment of the present disclosure, the antenna panel identification information indicates a fixed antenna panel in the terminal. The quantities of measurement resources corresponding to the at least one piece of antenna panel identification information are equal; or, the antenna panel identification information includes one piece of first antenna panel identification information and at least one piece of second antenna panel identification information, and the quantity of measurement resources corresponding to the first antenna panel identification information is greater than the quantity of measurement resources corresponding to all second antenna panel identification information.

In an embodiment of the present disclosure, the antenna panel identification information carries an antenna panel identifier of the fixed antenna panel, and the antenna panel identifier indicates the fixed antenna panel, or the antenna panel identification information indicates the RS identifier of an RS, and the RS identifier indicates the antenna panel corresponding to one transmit beam of the terminal, that is, instructing the terminal to transmit the SRS over the antenna panel used when the RS corresponding to the RS identifier is to be transmitted, or the RS identifier indicates the antenna panel corresponding to one receive beam of the terminal, that is, instructing the terminal to transmit the SRS over the antenna panel used when the RS corresponding to the RS identifier is received.

In an embodiment of the present disclosure, the antenna panel identification information includes the first antenna panel identification information, and the antenna panel identification information carries the antenna panel identifier.

The receiving module 520 is further operable to receive a downlink beam measurement report from the terminal, wherein the downlink beam measurement report includes at least two RS identifiers, L1-RSRPs corresponding to the at least two RS identifiers, and the antenna panel identification information corresponding to each RS identifier.

The configuring module 530 is further operable to determine an RS identifier corresponding to a largest L1-RSRP, and determine the antenna panel identifier corresponding to the RS identifier as the first antenna panel identification information, wherein the antenna panel identifier corresponding to the RS identifier is the identification of the antenna panel used when the RS is received and measured.

In an embodiment of the present disclosure, the antenna panel identification information includes the first antenna panel identification information, and the antenna panel identification information carries the RS identifier.

The receiving module 520 is further operable to receive a downlink beam measurement report from the terminal, wherein the downlink beam measurement report includes at least two RS identifiers and L1-RSRP corresponding to each RS identifier.

The configuring module 530 is further operable to determine the RS identifier corresponding to the largest L1-RSRP as the first antenna panel identification information, that is, instructing the terminal to transmit the RSR over the antenna panel used when the RS is received and measured.

In an embodiment of the present disclosure, the receiving module 520 is further operable to receive capability information from the terminal. The capability information includes the quantity of antenna panels supported by the terminal and the quantity of transmit beams supportable by the antenna panels, In an embodiment of the present disclosure, the capability information further includes a reciprocity indication, which indicates whether the terminal can learn the direction of an optimal transmit beam from the direction of an optimal receive beam.

In summary, in the apparatus for measurement configuration according to the to present disclosure, each measurement resource in the measurement configuration information corresponds to one piece of antenna panel identification information, such that the terminal is capable of transmitting the SRS over the SRS resource by the antenna panel indicated by each piece of antenna panel identification information. In this way, the access network device can know which SRSs can be transmitted at the same time, that is, the SRSs transmitted by different Is antenna panels can be transmitted at the same time. Therefore, the transmit beams corresponding to these SRSs that can be transmitted at the same time are configured for the terminal, and these transmit beams are operable to transmit the uplink PUSCH or PUCCH or SRS, or the transmit beams and the antenna panels which correspond to these SRSs that can be transmitted at the same time are configured for the terminal, and the transmit beams of these antenna panels are operable to transmit the uplink PUSCH or PUCCH or SRS, thereby improving the robustness of communication.

Figure 6:
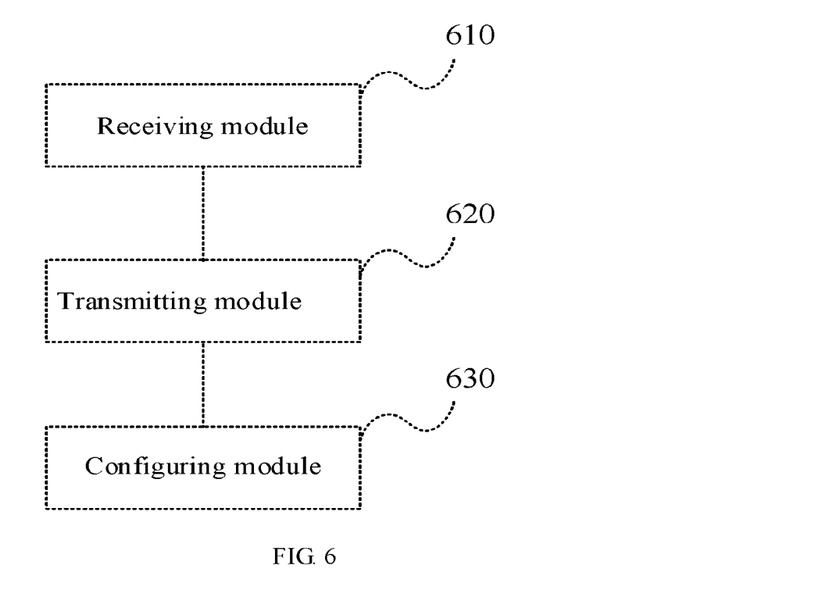
FIG. 6 is a block diagram of an apparatus for measurement configuration according to an exemplary embodiment.

FIG. 6 is a block diagram of an apparatus for measurement configuration according to an exemplary embodiment. The apparatus for measurement configuration is for applying to the terminal 202 shown in FIG. 2. As shown in FIG. 6, the apparatus for measurement configuration includes: a receiving module 610, a transmitting module 620, and a configuring module 630, The receiving module 610 is operable to receive measurement configuration information from an access network device, wherein the measurement configuration information includes at least one measurement resource and antenna panel identification information corresponding to each of the at least one measurement resource, and the measurement resource includes an SRS resource or SRS resource group.

The transmitting module 620 is operable to transmit an SRS to the access network device over each of the SRS resources, wherein the SRS is transmitted over an antenna panel indicated by the antenna panel identification information.

The configuring module 630 is operable to receive at least one piece of uplink transmission indication information from the access network device, determine an SRS ID corresponding to the uplink transmission indication information, and perform uplink transmission over a transmit beam corresponding to the SRS ID, or perform uplink transmission over a transmit beam and an antenna panel which correspond to the SRS ID, wherein the uplink transmission indication information is determined based on the SRS ID of at least one SRS which is selected by the network access device based on a measurement result of measuring SRSs transmitted by the terminal.

In an embodiment of the present disclosure, the antenna panel identification information indicates raw one antenna panel in the terminal, and the SRS transmitted over the measurement resource corresponding to the same antenna panel identification information is transmitted by the same antenna panel.

In an embodiment of the present disclosure, the antenna panel identification is information indicates a fixed antenna panel in the terminal. The quantities of measurement resources corresponding to the at least one piece of antenna panel identification information are equal; or, the antenna panel identification information includes a piece of the first antenna panel identification information and at least one piece of the second antenna panel identification information, and the quantity of measurement resources corresponding to the first antenna panel identification information is greater than the quantity of measurement resources corresponding to all second antenna panel identification information.

In an embodiment of the present disclosure, the antenna panel identification information carries an antenna panel identifier of the fixed antenna panel, and the antenna panel identifier indicates the fixed antenna panel, or the antenna panel identification information indicates the RS identifier of an RS, and the RS identifier indicates the antenna panel corresponding to one transmit beam of the terminal, that is, instructing the terminal to transit the RSR over the antenna panel used when the RS corresponding to the RS identifier is transmitted, or the RS identifier indicates the antenna panel corresponding to one receive beam of the terminal, that is, instructing the terminal to transmit the SRS over the antenna panel used when the RS corresponding to the RS identifier is received.

In an embodiment of the present disclosure, the antenna panel identification information includes the first antenna panel identification information, and the antenna panel identification information is the antenna panel identifier, then the transmitting module 620 is further operable to transmit a downlink beam measurement report to the access network device. The downlink beam measurement report includes at least two RS identifiers, L1-RSRP corresponding to each RS identifier, and the antenna panel identification information corresponding to each RS identifier, Besides, the access network device is operable to determine the RS identifier corresponding to the largest L1-RSRP, and determine the antenna panel identifier corresponding to the RS identifier as the first antenna panel identification information. The antenna panel identifier corresponding to the RS identifier is the identification of the antenna panel used when the RS is received and measured.

In an embodiment of the present disclosure, the antenna panel identification information includes the first antenna panel identification information, and the antenna panel identification information indicates the RS identifier, then the transmitting module 620 is further operable to transmit a downlink beam measurement report to the access network device. The downlink beam measurement report includes at least two RS identifiers and L1-RSRP corresponding to each RS identifier. Besides, the access network device is operable to determine the RS identifier corresponding to the largest L1-RSRP as the first antenna panel identification information, that is, instructing the terminal to transmit the SRS over the antenna panel used when the RS is received and measured.

In an embodiment of the present disclosure, the transmitting module 620 is further operable to transmit capability information to the access network device. The capability information includes the quantity of antenna panels supported by the terminal and the quantity of transmit beams supportable the antenna panels.

In an embodiment of the present disclosure, the capability information further includes a reciprocity indication, which indicates whether the terminal can learn the direction of an optimal transmit beam from the direction of an optimal receive beam.

In summary, in the apparatus for measurement configuration according to the present disclosure, because each measurement resource in the measurement configuration information corresponds to one piece of antenna panel identification information, the terminal is capable of transmitting the SRS over the SRS resource by the antenna panel indicated by each piece of antenna panel identification information. In this way, the access network device can know which SRSs can be transmitted at the same time, that is, the SRSs transmitted over different antenna panels can be transmitted at the same time. Therefore, the transmit beams corresponding to these SRSs that can be transmitted at the same time are configured for the terminal, and these transmit beams are operable to transmit the uplink PUSCH or PUCCH or SRS, thereby improving the robustness of communication.

An exemplary embodiment of the present disclosure provides an access network device that can implement the method for measurement configuration according to the present disclosure. The UE includes a processor and a memory for storing at least one instruction executable by the processor.

The processor is operable to transmit measurement configuration information to a terminal, wherein the measurement configuration information includes at least one measurement resource and antenna panel identification information corresponding to each of the at least one measurement resource, the measurement resource including an SRS resource or an SRS resource to group. The processor is further operable to receive an SRS transmitted by the terminal over each of the SRS resources, wherein the SRS is transmitted over an antenna panel indicated by the antenna panel identification information, and measure the SRS transmitted by the terminal, select at least one SRS based on a measurement result, and transmit uplink transmission indication information corresponding to an SRS ID of the at least one SRS to the terminal. The terminal is operable to determine the SRS ID corresponding to the uplink transmission indication information, and perform uplink transmission over a transmit beam corresponding to the SRS or perform uplink transmission over a transmit beam and an antenna panel which correspond to the SRS ID.

An exemplary embodiment of the present disclosure provides a terminal capable of implementing the method for measurement configuration according to the present disclosure. The base station includes a processor and a memory for storing at least one instruction executable by the processor.

The processor is operable to receive measurement configuration information from an access network device, wherein the measurement configuration information includes at least one measurement resource and antenna panel identification information corresponding to the at least one measurement resource, the measurement resource including an SRS resource or SRS resource group. The processor is further operable to transmit an SRS to the access network device over each of the SRS resources, wherein the SRS is transmitted over an antenna panel indicated by the antenna panel identification information, and receive at least one piece of uplink transmission indication information from the access network device, determine an SRS ID corresponding to the uplink transmission indication information, and perform uplink transmission over a transmit beam corresponding to the SRS ID, or perform uplink transmission over a transmit beam and an antenna panel which correspond to the SRS ID. The uplink transmission indication information is determined based on the SRS ID of at least one SRS which is selected by the network access device based on a measurement result of measuring SRSs transmitted by the terminal.

Figure 7:
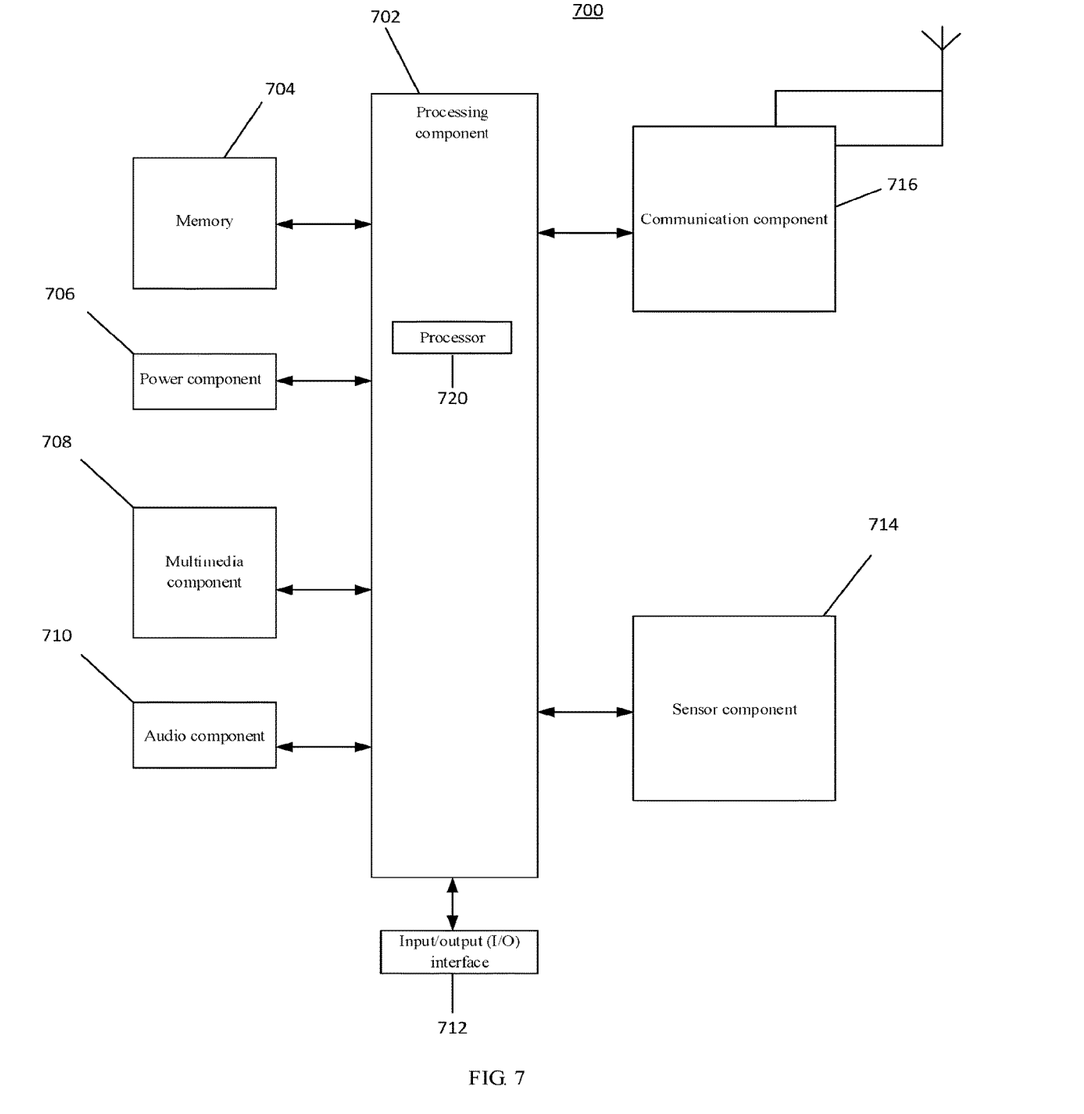
FIG. 7 is a block diagram of an apparatus for measurement configuration according to an exemplary embodiment.

FIG. 7 is a block diagram of an apparatus for measuring configuration 700 according to an exemplary embodiment. For example, the apparatus 700 may be a mobile phone, a computer, a digital broadcasting terminal, a message transceiving device, a game console, a tablet device, a medical device, a fitness device, a personal digital assistant, and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the apparatus 700, such as the operations associated with display, telephone calls, data communications, camera operations, and recording operations. The processing component 702 s may include one or more processors 720 to execute instructions to perform all or part of the steps in the above-described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is operable to store various types of data to support the operation of the apparatus 700. Examples of such data include instructions for any applications or methods operated on the apparatus 700, contact data, phonebook data, messages, pictures, videos, or the like. The memory 704 may be implemented by any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The power component 706 provides power to various components of the apparatus 700 for configuring a network parameter. The power component 706 may include a power management system, one or more power sources, and other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the time duration and a pressure associated with the touch or swipe action. In some embodiments, the multimedia component 708 includes a front camera and/or a rear camera. The front camera and the rear camera may receive external multimedia data while the apparatus 700 is in an operation mode, such as a photographing mode or a video mode. Each of the front camera and the rear camera may be a fixed optical lens system or have focus and optical zoom capability.

The audio component 710 is operable to output and/or input audio signals. For example, the audio component 710 includes a microphone (MIC) operable to receive external audio signals when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and peripheral interface modules, such as a keyboard, a click wheel, buttons, and the like. The buttons may include, but are not limited to, a home button, a volume button, a start button, and a lock button.

The sensor component 714 includes one or more sensors to provide state assessments of various aspects of the apparatus 700. For instance, the sensor component 714 may detect an enable/disable state of the apparatus 700, relative positioning of components, e.g., the display device and the mini-keypad of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor operable to detect the presence of nearby objects without any physical contact. The sensor component 714 may also include a light sensor, such as a complementary metal oxide semiconductor (CMOS) or charge-coupled device (CCD) image sensor, configured for imaging applications. In some embodiments, the sensor component 714 may also include an accelerometer sensor, a gyroscope sensor, a magnetic sensor, a pressure sensor, or a temperature sensor.

The communication component 716 is operable to facilitate communication, wired or wirelessly, between the apparatus 700 and other devices. In embodiments of this disclosure, the communication component 716 can access a wireless network based on any communication standard, such as Wi-Fi, 2G, 3G, 4G or 5G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications.

In exemplary embodiments, the apparatus 700 may be implemented with one or more application specific integrated circuits (ASICs), digital signal processors (DSPs), digital to signal processing devices (DSPDs), programmable logic devices (TWO, field programmable gate arrays (FP-GAs), controllers, micro-controllers, microprocessors, or other electronic components, for performing the above-described methods.

In exemplary embodiments, a non-transitory computer readable storage medium including instructions is also provided, such as the memory 704 included instructions, executable by the processor 720 in the apparatus 700, for performing the above-described methods. For example, the non-transitory computer-readable storage medium may be a ROM, a RAM, a CD-ROM, a magnetic tape, a floppy disc, an optical data storage device, and the like.

The instructions in a non-transitory computer-readable storage medium, when executed by the processor of a mobile terminal, cause the mobile terminal to execute the above method for measurement configuration.

Figure 8:
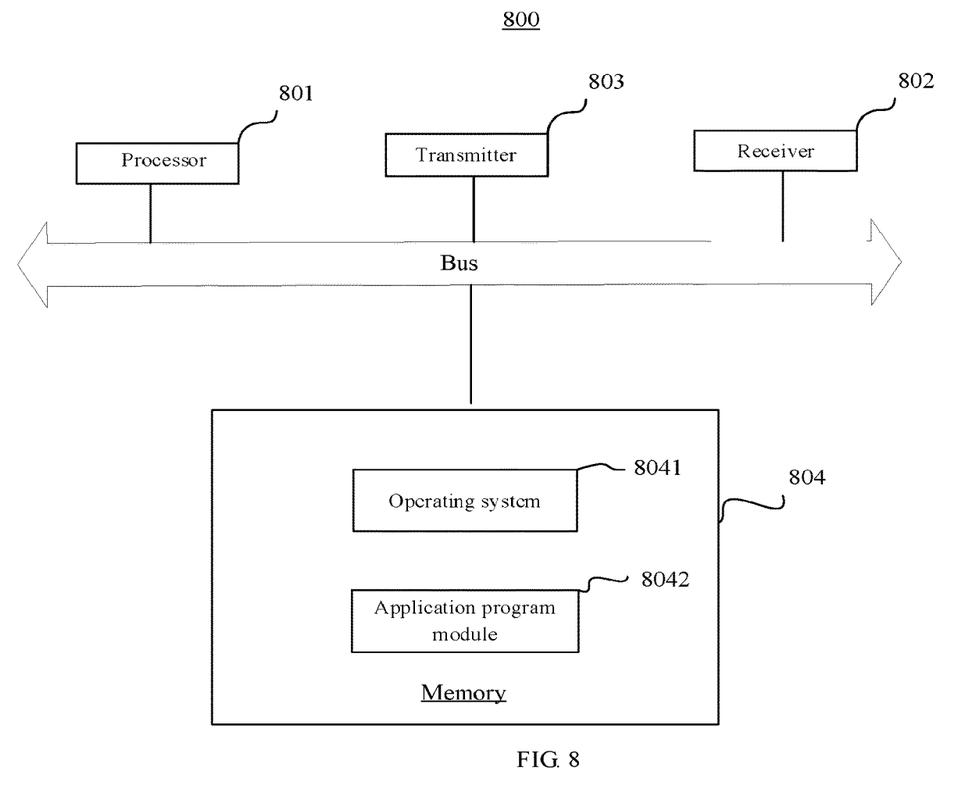
FIG. 8 is a block diagram an apparatus for measurement configuration according to an exemplary embodiment.

FIG. 8 is a block diagram of an apparatus for measurement configuration 800 according to an exemplary embodiment, For example, the apparatus for measurement configuration 800 may be a base station. As shown in FIG. 8, the apparatus for measurement configuration 800 may include: a processor 801, a receiver 802, a transmitter 803, and a memory 804. The receiver 802, the transmitter 803 and the memory 804 are respectively connected to the processor 801 via a bus.

The processor 801 includes one or more processing cores, and the processor 801 executes the method executed by the base station in the method for measurement configuration according to the embodiments of the present disclosure by running software programs and modules. The memory 804 may be operable to store the software programs and modules. Specifically, the memory 804 may store an operating system 8041, and an application program module 8042 required by at least one function. The receiver 802 is operable to receive communication data transmitted by other devices, and the transmitter 803 is operable to transmit the communication data to other devices.

Figure 9:
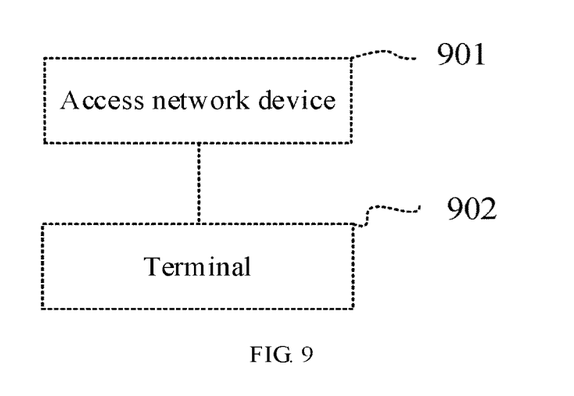
FIG. 9 is a block diagram of a mobile communication system according to an exemplary embodiment.

FIG. 9 is a block diagram of a mobile communication system according to an exemplary embodiment. As shown in FIG. 9, the mobile communication system includes an access network device 901 and a terminal 902.

The access network device 901 is operable to execute the method for measurement configuration executed by the access network device in the embodiment shown in FIG. 3 or 4.

The terminal 902 is operable to execute the method for measurement configuration executed by the terminal in the embodiment shown in FIG. 3 or 4.

An exemplary embodiment of the present disclosure provides a non-transitory to computer-readable storage medium storing at least one instruction, at least one program, a code set, or an instruction set therein, wherein the at least one instruction, the at least one program, the code set, or the instruction set, when loaded and executed by a processor, causes the processor to perform the above method for measurement configuration.

Other embodiments of the present disclosure will be apparent to those skilled in is the art from consideration of the description and practice of the present disclosure. The present disclosure is intended to cover any variations, uses, or adaptations of the present disclosure following general principles of the present disclosure and including the common general knowledge or conventional technical means in the art which is not disclosed in the present disclosure. The description and embodiments are to be considered as exemplary only, with a true scope and spirit of the present disclosure being indicated by the following claims.

It should be understood that the present disclosure is not limited to the exact constructions that has been described above and shown in the accompanying drawings, and that various modifications and changes may be made without departing from the scope thereof. The scope of the present disclosure is only subject to the appended claim.

What is claimed is:

1. A method for measurement configuration that is implemented by an access network device, the method comprising:
    transmitting measurement configuration information to a terminal in response to failure of receiving, by the access network device, an indication that indicates the terminal is capable of acquiring a direction of an optimal transmit beam from a direction of an optimal receive beam the measurement configuration information including at least one measurement resource and at least one piece of antenna panel identification information corresponding to the at least one measurement resource, where the measurement resource further includes a sounding reference signal (SRS) resource or an SRS resource group;
    receiving SRSs transmitted by the terminal over SRS resources, each of the SRSs being transmitted by the terminal over each of the SRS resources over an antenna panel indicated by the antenna panel identification information; and
    selecting at least one SRS based on a measurement result from the terminal measuring the SRSs and transmitting uplink transmission indication information corresponding to an SRS identifier (ID) of the at least one SRS to the terminal, wherein the terminal is operable to determine the SRS ID corresponding to the uplink transmission indication information, and perforin uplink transmission over: a transmit beam corresponding to the SRS ID, or a transmit beam and an antenna panel corresponding to the SRS ID.

2. The method according to claim 1, wherein the antenna panel identification information indicates an antenna panel in the terminal, and the SRS transmitted over the measurement resource corresponding to the same antenna panel identification information is transmitted over the same antenna panel.

3. The method according to claim 1, wherein:
    each of the at least one piece of the antenna panel identification information indicates a fixed antenna panel in the terminal,
    quantities of measurement resources corresponding to the at least one piece of antenna panel identification information are equal, or the antenna panel identification information includes one piece of first antenna panel identification information and at least one piece of second antenna panel identification information, and a quantity of measurement resources corresponding to the first antenna panel identification information is greater than a quantity of measurement resources corresponding to all second antenna panel identification information.

4. The method according to claim 3, wherein
the antenna panel identification information carries an antenna panel identifier of the fixed antenna panel that indicates the fixed antenna panel; or
the antenna panel identification information indicates an RS identifier of a reference signal (RS) that indicates the antenna panel corresponding to: one transmit beam of the terminal, or one receive beam of the terminal.

5. The method according to claim 4, wherein:
the antenna panel identification information includes the first antenna panel identification information, and the antenna panel identification infolination carries an antenna panel identifier, and
the method further comprises:
receiving a downlink beam measurement report from the terminal, the downlink beam measurement report including at least two RS identifiers, layer-1 reference signal received powers (L1-RSRPs) corresponding to the at least two RS identifiers, and the antenna panel identification information corresponding to the at least two RS identifiers; and
determining an RS identifier corresponding to a largest L1-RSRP, and determining the antenna panel identifier corresponding to the RS identifier as the first antenna panel identification information.

6. The method according to claim 4, wherein:
the antenna panel identification information includes the first antenna panel identification information, and the antenna panel identification information indicates the RS identifier, and
the method further comprises:
receiving a downlink beam measurement report from the terminal, the downlink beam measurement report including at least two RS identifiers and layer-1 reference signal received powers (L1-RSRPs) corresponding to the at least two RS identifiers; and
determining an RS identifier corresponding to a largest L1-RSRP as the first antenna panel identification information.

7. The method according to claim 6, further comprising:
receiving capability information from the terminal, the capability information including the quantity of antenna panels supported by the terminal and the quantity of transmit beams supportable the antenna panels.

8. The method according to claim 7, wherein the capability information further comprises the indication.

9. A non-transitory computer-readable storage medium storing at least one instruction that, when executed by a processor, causes the processor to perform the method according to claim 1.

10. A method for measurement configuration that is implemented by a terminal, the method comprising:
receiving measurement configuration information from an access network device in response to failure of receiving, by the access network device, an indication that indicates the terminal is capable of acquiring a direction of an optimal transmit beam from a direction of an optimal receive beam, the measurement configuration information including at least one measurement resource and antenna panel identification information corresponding to each of the at least one measurement resource, the measurement resource further including a sounding reference signal (SRS) resource or an SRS resource group;
transmitting the SRSs to the access network device over SRS resources, each of the SRS resources being transmitted by the terminal over each of the SRS resources; and
receiving at least one piece of uplink transmission indication information from the access network device, determining an SRS identifier (ID) corresponding to the uplink transmission indication information, and performing uplink transmission over: a transmit beam corresponding to the SRS ID, or the transmit beam and an antenna panel which correspond to the SRS ID, wherein the uplink transmission indication information is determined based on the SRS ID of at least one SRS which is selected by the network access device based on a measurement result of measuring SRSs transmitted by the terminal.

11. The method according to claim 10, wherein the antenna panel identification information indicates any one antenna panel in the terminal, and the SRS transmitted over the measurement resource corresponding to the same antenna panel identification information is transmitted over the same antenna panel.

12. The method according to claim 10, wherein:
the antenna panel identification information indicates a fixed antenna panel in the terminal,
quantities of measurement resources corresponding to the at least one piece of antenna panel identification information are equal, or
the antenna panel identification information includes one piece of first antenna panel identification information and at least one piece of second antenna panel identification information, and a quantity of measurement resources corresponding to the first antenna panel identification information is greater than a quantity of measurement resources corresponding to all second antenna panel identification information.

13. The method according to claim 12, wherein:
the antenna panel identification information carries an antenna panel identifier of the fixed antenna panel, the antenna panel identifier indicating the fixed antenna panel, or
the antenna panel identification information carries an RS identifier of an RS, the RS identifier indicating the antenna panel corresponding to one transmit beam of the terminal, or one receive beam of the terminal.

14. The method according to claim 13, wherein:
the antenna panel identification information includes the first antenna panel identification information, and the antenna panel identification information carries an antenna panel identifier, and
the method further comprises:
transmitting, by the terminal, a downlink beam measurement report to the access network device, the downlink beam measurement report including at least two RS identifiers, layer-1 reference signal received powers (L1-RSRPs) corresponding to the at least two RS identifiers, and the antenna panel identification information corresponding to the at least two RS identifiers, and the access network device being operable to determine an RS identifier corresponding to a largest L1-RSRP, and determine the antenna panel identifier corresponding to the RS identifier as the first antenna panel identification information.

15. The method according to claim 13, wherein:
the antenna panel identification information includes the first antenna panel identification information, and the antenna panel identification information indicates the RS identifier; and
the method further comprises:
   transmitting, by the terminal, a downlink beam measurement report to the access network device, the downlink beam measurement report including at least two RS identifiers and layer-1 reference signal received powers (L1-RSRPs) corresponding to the at least two RS identifiers, and the access network device being operable to determine an RS identifier corresponding to a largest L1-RSRP as the first antenna panel identification information.

16. The method according to claim 15, further comprising:
   transmitting, by the terminal, capability information to the access network device, the capability information including a quantity of antenna panels supported by the terminal and a quantity of transmit beams supportable by the antenna panels.

17. The method according to claim 16, wherein the capability information further includes the indication.

18. A non-transitory computer-readable storage medium storing at least one instruction, that, when executed by a processor, causes the processor to perform the method according to claim 10.

19. An access network device, comprising:
a first processor; and
a first memory for storing at least one instruction executable by the first processor,
   wherein, when the first processor executes the at least one instruction, the first processor performs the method according to claim 1.

20. A terminal, comprising:
a second processor; and
a second memory for storing at least one instruction executable by the processor;
wherein, when the second processor executes the at least one instruction, the second processor implements operations comprising:
receiving measurement configuration information from an access network device in response to failure of receiving, by the access network device, an indication that indicates the terminal is capable of acquiring a direction of an optimal transmit beam from a direction of an optimal receive beam, the measurement configuration information including at least one measurement resource and antenna panel identification infoiination corresponding to each of the at least one measurement resource, the measurement resource including a sounding reference signal (SRS) resource or an SRS resource group;
transmitting the SRSs to the access network device over SRS resources, the SRS being transmitted by the terminal over each of the SRS resources; and
receiving at least one piece of uplink transmission indication information from the access network device, determining an SRS identifier (ID) corresponding to the uplink transmission indication information, and performing uplink transmission over: a transmit beam corresponding to the SRS ID, or a transmit beam and an antenna panel corresponding to the SRS ID, wherein the uplink transmission indication information is determined based on the SRS ID of at least one SRS which is selected by the network access device based on a measurement result of measuring SRSs transmitted by the terminal.

* * * * *